United States Patent [19]

Lehmann

[11] Patent Number: 4,896,530
[45] Date of Patent: Jan. 30, 1990

[54] METHOD OF LEAK TESTING, LEAK TESTING DEVICE, AND TEMPERATURE MEASURING DEVICE AS WELL AS A METHOD FOR MEASURING A TEMPERATURE VALUE

[76] Inventor: Martin Lehmann, Obere Farnbühlstrasse 1, 5610 Wohlen, Switzerland

[21] Appl. No.: 6,554
[22] PCT Filed: Apr. 9, 1986
[86] PCT No.: PCT/CH86/00043
§ 371 Date: Feb. 6, 1987
§ 102(e) Date: Feb. 6, 1987
[87] PCT Pub. No.: WO86/06166
PCT Pub. Date: Oct. 23, 1986

[30] Foreign Application Priority Data
Apr. 12, 1985 [CH] Switzerland .................. 1577/85

[51] Int. Cl.[4] ............................................. G01M 3/32
[52] U.S. Cl. ......................................................... 73/49.2
[58] Field of Search ........................................ 73/49.2

[56] References Cited

U.S. PATENT DOCUMENTS

| | | | |
|---|---|---|---|
| 3,800,586 | 4/1974 | Delatorre et al. | 73/49.2 |
| 3,987,664 | 10/1976 | Hass et al. | 73/49.2 |
| 4,272,985 | 6/1981 | Rapson, Jr. et al. | 73/49.2 |
| 4,532,795 | 8/1985 | Brayman et al. | 73/49.2 X |
| 4,625,545 | 12/1986 | Holm et al. | 73/49.2 X |
| 4,675,834 | 6/1987 | Furuse | 73/49.2 X |

Primary Examiner—John Chapman
Assistant Examiner—Joseph W. Roskos
Attorney, Agent, or Firm—Antonelli, Terry & Wands

[57] ABSTRACT

In order to improve existent methods for measuring the sealing of tanks (1), the temperature ($\theta_1$) of the tank is measured when taking up a magnitude relative to the pressure (p) representative of a leak. A predetermined magnitude relative to a limit pressure ($p_G$) to decide whether a tank fulfils the required sealing conditions at a temperature ($\theta_2$) is calculated for a measurement temperature ($\theta_1$); the actual pressure value and the limit or ultimate pressure value at this measurement temperature ($\theta_1$) are then compared. Thereby, pressure variations due to temperature variations are taken into account.

22 Claims, 6 Drawing Sheets

METHOD OF LEAK TESTING, LEAK TESTING DEVICE, AND TEMPERATURE MEASURING DEVICE AS WELL AS A METHOD FOR MEASURING A TEMPERATURE VALUE

The present invention relates to a method for leak testing containers wherein the container is pressurized or evacuated and a pressure value is measured as an indication of the degree of leakage, in other words a change in the container pressure, in the difference between the pressure in the container and an ambient pressure, in the ambient pressure or values dependent thereon, and wherein a limiting pressure value or a corresponding limiting value is preselected to determine whether a container is considered to be tight or leaky.

It should be emphasized that a value referred to hereinbelow as a "pressure value" can be a pressure differential, an absolute pressure, or a value derived therefrom such as mechanical deformation, etc.

The invention also refers to a leak testing device, for example to work this method, as well as a temperature measuring arrangement for such a leak testing device, and also to a method of measuring a temperature value on a body, which is significant for the thermal energy content of the body, by means of a quasi point temperature measurement.

Containers are manufactured today at a high manufacturing speed. This is especially true for soldered cans. The increase in production rate on the one hand and the use of increasingly thinner-walled material on the other require a high degree of precision in the manufacturing process to ensure a high degree of tightness for the containers. Likewise, on a filling line, in other words from the standpoint of the can user, a high degree of tightness is required so that foods do not spoil and environmentally hazardous or very valuable materials do not escape from the containers. Both the manufacturer and the user of such containers require a smoothly functioning, reliable quality control process. Even the smallest leaks must be detectable. This severe requirement on leak testing can already be met.

Tightness can be tested in various ways. The container can be pressurized or evacuated using air or a gas. If a leak is present, air or gas then flows in or out of the environment, changing the internal pressure in the container.

In some methods, the internal pressure of the container is observed, i.e. the internal pressure difference of the container is measured over a pre-determined time interval and compared with a limit pressure change value occurring for a container with the largest leak still tolerable. If the measured internal pressure change is greater than the preset limit pressure difference, the container is labeled a reject. In this case, therefore, a change in the internal pressure of the container is observed as a pressure value. In other methods, the container to be tested is enclosed in an autoclave. The air escaping from the container under test flows into the autoclave and increases the pressure in it, which is recorded in turn. In this instance, the pressure value registered is a change in the ambient pressure surrounding the container.

In view of the fact that the internal pressure of the container drops as a result of leakage (or increases when evacuated), and the ambient pressure surrounding the container increases (decreases when evacuated), it is also quite possible to use the behavior of the internal pressure of the container relative to the outside pressure surrounding the container in combination.

In view of these different methods, we will refer in the following in our discussion of leak testing to the recording of a pressure value. It makes no difference how the latter is measured, directly or indirectly, within the scope of the present invention.

The containers are leak-tested either after manufacture or after being filled. In both cases they are at undefined temperatures depending on the manufacturing steps that have gone before. This temperature not only varies from system to system, but also at a given point within a given system. Among the reasons for this temperature spread are the processing of different containers or a variable production rate, a variable ambient temperature at various points, or differences in container material. It is also possible that as a result of a malfunction on the production line, it must be stopped and then re-started in such fashion that the containers to be tested are exposed to different temperatures at the same point on the production line. At the time the containers are being leak-tested, therefore, it is not necessarily true that the container temperature will always be the same. Even in the case of an ambient temperature which is kept constant within relatively close tolerances, the container temperature has not always reached thermal equilibrium with the environment at the leak testing location.

We will now discuss the case in which the container is subjected to "overpressure." The conditions, however, remain fundamentally the same as when the container is exposed to "underpressure." If a container is filled with air, the container wall will give off heat to the air which is introduced because its temperature is higher. The resultant temperature increase of the air increases its pressure while the air volume remains constant. The pressure difference with respect to the environment increases and the air density changes. Hence, the leak rate also changes with respect to that which would be measured at a different temperature of the same air volume in the container. It is greater at higher pressures. If a pressure value at a lower temperature is specified as the limit pressure value, the can will erroneously be labeled a reject at higher temperature. The increased leak rate is due to the temperature-related increase in internal pressure.

The goal of the present invention is to considerably improve known leak testing methods which are already very accurate as far as the recording of these pressure value changes is concerned, by eliminating one important problem value, the temperature of the container.

This is accomplished in a process according to present invention by taking into account a temperature difference between a temperature at which the limit pressure value is determined and a temperature when the pressure value is measured, when the limit pressure value are compared and the measured pressure value.

We must now make a basic distinction between two cases:

In the former case, a temperature measurement is performed in the same time interval in which the leak test occurs. It is referred to as a time interval because the latter also incorporates the idea of "quasi simultaneously", when the time difference with respect to the thermal container time constants is only negligible. If the temperature measurement is performed quasi simultaneously with the leak test in this case, the thermal behavior of the container need not be taken into account and a limit pressure value or measured pressure value correction can be made using the measured temperature, possibly the temperature difference with respect to the environment, if the latter cannot be assumed to be a stable reference value.

In the second case, the temperature measurement is performed essentially before or after the leak test. In these cases, the measured temperature cannot be used directly for pressure value correction purposes, but only after the temperature during the leak testing interval has been determined by forward or backward extrapolation in time, for which prior knowledge or indentification of the thermal behavior of the container is required. It is only after the temperature during the leak test has been found that the latter can in turn be used for purposes of correction of one or another of the pressure values.

It is now proposed that a container temperature be recorded which is representative of the temperature during the time interval of the pressure value measurements, by direct measurement or identification and the pre-determined limit pressure value or the measured pressure value is corrected on the basis of the difference between the temperature recorded and that temperature at which limit pressure value is preselected.

In another case, it is proposed that at least one container temperature be measured before or after the pressure value measurement, that the thermal time behavior of the container be determined as a function of the difference with respect to the ambient temperature, and that, during the time interval of pressure value measurement, while taking into account the time difference of the measurement of the container temperature and the time behavior one, determines the temperature of the container within the period of the pressure value measurement.

It is also proposed that the temperature dependence of the limit pressure value or of the measured pressure value be considered either after the container temperature during the time interval of pressure value measurement is determined by calculation for determining the correction of the corresponding value, or that this dependence be stored as a function of the independent variable "temperature" and is included in a function of the measured or determined container temperature during the pressure value measurement.

If we assume, at least in a first approximation, a linear dependence between the temperature and gas pressure at a constant volume, it is therefore possible, either from knowledge of the algebraic relationship between the pressure and temperature, to convert the measured pressure value or the pre-determined limit pressure value according to the temperature prevailing at the moment of measurement of the leak-significant pressure value or, by means of an analog function generator, to store the above-mentioned linear function so that with the temperature at the point in time of the leak-significant pressure value measurement is entered as an input value into this function and the above-mentioned function generator, on the output side, produces a pressure value signal or its correction which is relevant at this temperature.

For time-shifted temperature and leak measurement, it is also proposed that the thermal time behavior of the container be determined from measurement of at least one container temperature as well as pre-determination of the thermal container time constant - the latter being determined by computation, taking into account the container and/or filling medium parameters determining that constant, or being determined experimentally.

It is more flexible in this regard to take into account the fact that the thermal time behavior of the container can change, especially with variable-type containers, wherein the thermal time behavior of the container is identified from time-shifted measurements of container temperatures, preferably taking into account the measurement time interval.

In all the above-mentioned versions, temperature measurement is rendered less sensitive to noise by virtue of the fact that it is carried out by performing several measurements during the measurement interval. Another problem in temperature measurement in all of the versions of the method already mentioned later, and which will be mentioned results from the fact that the temperature need not be equalized at the container. In addition, the thermal radiation which is actually recorded particularly in now contact temperature measurements, depends on the material, surface quality, etc., at different points on the container. In order therefore to achieve a representative temperature measurement, it is further proposed that the latter be performed by carrying out several measurements at different points on the container.

The latter problem is solved by determining the container temperature before measuring the pressure value and before sealing the container, by measuring the thermal radiation from the container cavity, as a measure of the integral thermal energy state of the container. It has been found that the container cavity acts like a black body and the heat radiation from this cavity leads in fact to the desired representative, i.e. average, temperature measurement. This measurement takes into account local differences in the inner and outer surface, material, etc.

The latter procedure is extraordinarily simple, especially with relative movement of container and temperature measuring system whereby, in an additional advantageous manner, the signal shape of the detected radiation when the container opening enters the sensitivity range of the system, is used as a criterion to detect when the system is measuring in representative fashion. In other words, use is made of the fact that the detected thermal radiation differs considerably according to whether the detector of the system is detecting the radiation when no container cavity is located adjacent the system, or when a container cavity is adjacent the system. This signal shape is then used directly to determine when the detector output signal is representative of the container temperature, i.e. when this output signal may be processed further.

The leak testing device according to the invention comprises a temperature measuring device for the container possibly for the environment also. Basically, a temperature measuring arrangement or device is connected with one input of a correcting unit, at the output of which a signal appears as a function of the signal at the input, whereby preferably the output of the correcting unit is fed to one input of a comparison unit, comprising a second input to which another signal is fed which corresponds to a measured pressure value which is representative of the leak conditions.

In one embodiment, the correcting unit comprises a calculating unit or a function generator with a stored function of the signal at the correcting unit input.

It is also proposed that one output from a temperature measuring device be connected to one input of a time function unit, that a switching element be provided which indicates the performance of the leak test, whereby the switching element the controls the readout of the output signal from the time function unit, and that the output signal from the time function unit, corresponding to the container temperature when the switching element is triggered, be led to the input of the correcting unit.

Hence, a time function is triggered at the temperature measurement which functions corresponds to the thermal behavior of the container and when the leak test is performed, the time function value then prevailing, is read out.

With the microprocessor technology in conventional use today, it is also proposed that the time function unit comprise a computer unit, with an input device for inputting container and/or filling medium parameters, and which calculates the thermal time constant of the container and preferably, at least when the switching element is triggered, calculates and outputs the value of a time function at the point in time when triggering occurs, from the signal at the input of the time function unit and the time constant.

In another embodiment, the temperature measurement device outputs a measured value of at least two points in time and the time function unit identifies, from the measured values and possibly from the time difference of their appearance, the thermal time behavior of the container, especially its time constant; the time function unit then simulates this behavior with at least one measured temperature value as a one function value. The above-mentioned switching element then switches one output of the time function unit to the correcting unit, with a signal value which is representative of the container temperature at that moment.

An extremely simple simultaneous identification and simulation of the thermal behavior of the container is achieved by virtue of the fact that the time function unit comprises a plurality of time function generators with different time functions, and by the fact that all of them are excited at a single point in time by a single measured value, and by the fact that the thermal behavior of the container is identified by comparison of each of the generator output signals at another point in time with the other measured value and selection of the generator whose output signal differs least from the other measured value as the simulation generator, and by the fact that the switching element switches the output of this simulation generator to the correcting unit.

In this manner, identification is performed by comparison of the measured temperature values at two points in time with the output signals of the generators and it is the generator which shows the least deviation which is identified as the simulation generator for the thermal container behavior.

In order to increase temperature measurement accuracy, it is also proposed that the temperature measurement system perform a plurality of measurements, as by sampling, at time intervals which rapidly follow one another, and that the systems followed by a averaging unit whose output signal is processed further in the manner described as the measured temperature value signal.

In order to obtain a temperature measurement for the temperature state of the container which is representative in every case, it is proposed that the temperature measurement device comprise a plurality of sensors whose outputs are supplied to an averaging unit, whose output signal is in turn processed further.

In extremely simple fashion, in the manner described above, a temperature measurement representative of the container is performed by virtue of the fact that a temperature measuring device comprises a sensor which is located relative to the container in such fashion that its opening lies in its sensitivity range and, with a relative movement between container and sensor, a position detector is preferably provided which then switches the sensor output further as a temperature-representative signal when the container opening is in the sensitivity range of the sensor. This is accomplished without major additional expense by virtue of the fact that the position detector is formed by the sensor itself, to which a threshold value unit is connected, the latter then switching the sensor output further when the output signal of the sensor reaches its threshold value.

In addition, the present invention deals with the problem of measuring the temperature of a body of whatever shape, which temperature is representative of the body temperature state or its thermal energy state. Such problems not only occur in the leak testing complex described above, but also in completely different technologies, such as the determination of the temperature of metal bars when subjected to specific thermal treatment, etc. In this instance, for example the body temperature is usually determined by a sensor which is either inserted into a specimen bar, with associated expense, or which detects its surface radiation, with associated inaccuracy, because for example the temperature of the side of the bar facing away from the detector is largely left out of account. This problem can now be solved in an extremely simple fashion according to the invention by a method for measuring a temperature value on a body which is significant for the thermal energy content of the body, by means of a quasi point temperature measurement, in which a depression is made in the body and the temperature measurement is made directly above the depression.

As already mentioned, the depression acts like a black body, so that the thermal radiation from the depression is representative of the three-dimensional energy state of the body.

The invention will now be described in greater detail with reference to the figures.

FIG. 1 shows, with reference to a block diagram, the method according to the invention and the device according to the invention with quasi-simultaneous temperature measurement and leak testing.

FIG. 2, in a representation analogous to FIG. 1, shows another version of the method according to the invention and the device according to the invention.

Figure 5:
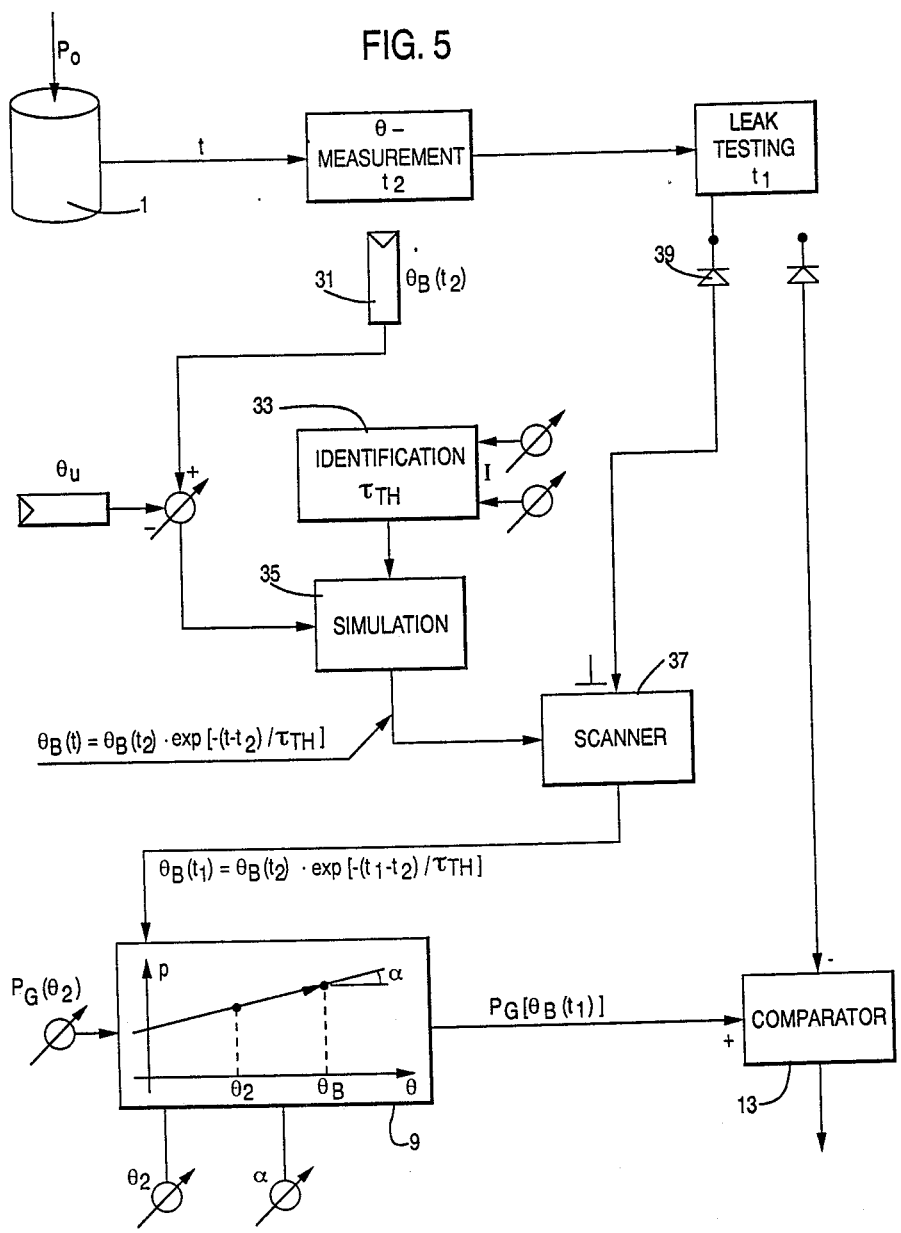
FIG. 5 shows another embodiment of the method according to the invention and the device according to the invention with reference to a block diagram, with a time shift of temperature measurement and leak testing.
Figure 8:
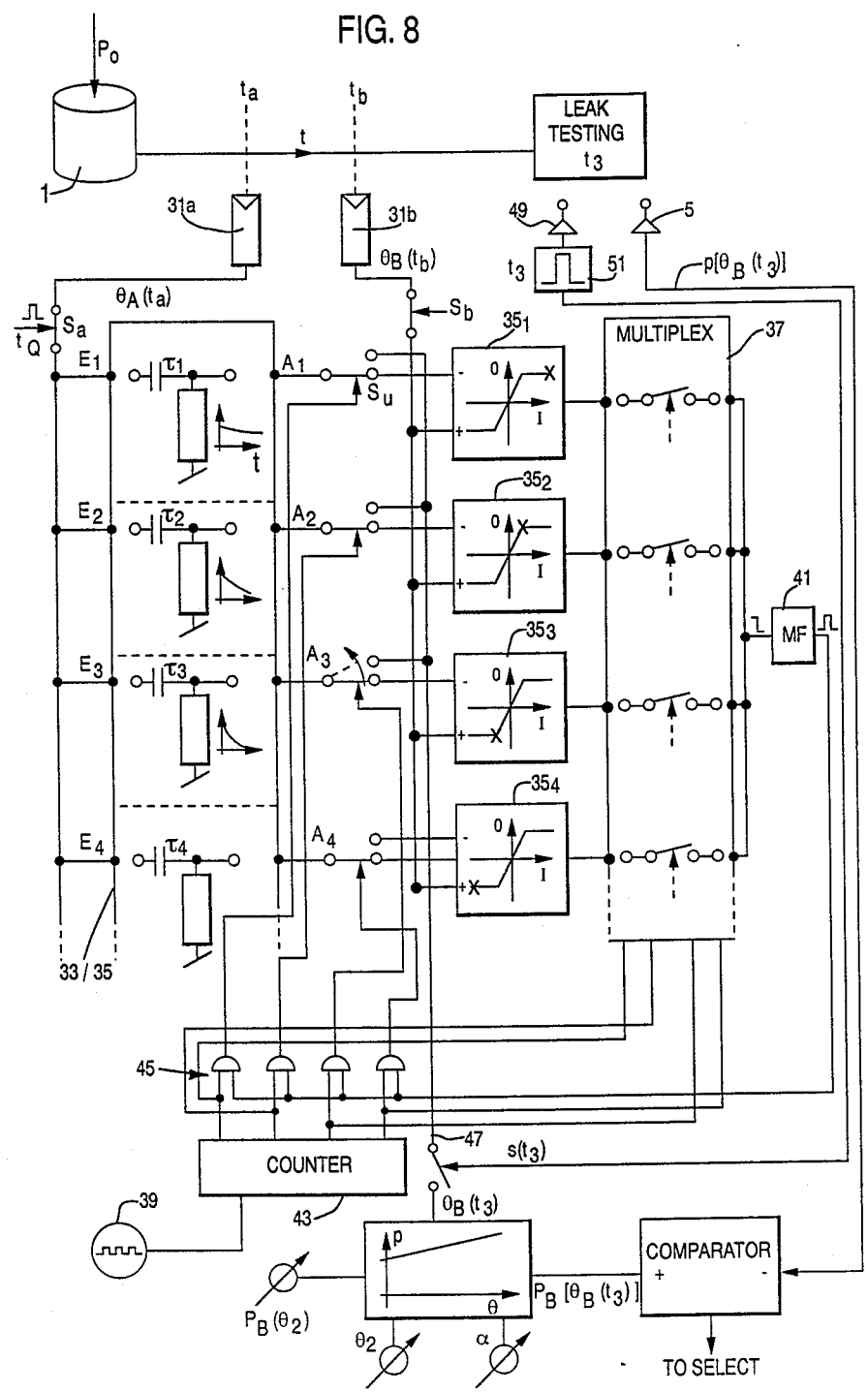

FIG. 8, with reference to a detailed block diagram, shows another embodiment of the device according to FIG. 5 for on-line identification and simulation of thermal container behavior as a function of time.

Figure 9:
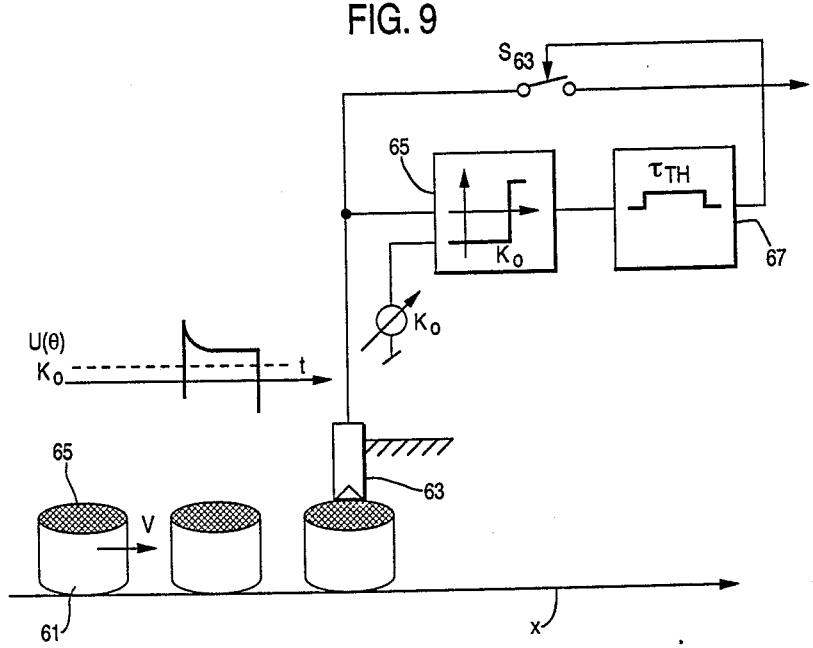

FIG. 9 is an arrangement according to the invention for a heat sensor such as a pyroelectric detector, shown schematically.

Figure 10:
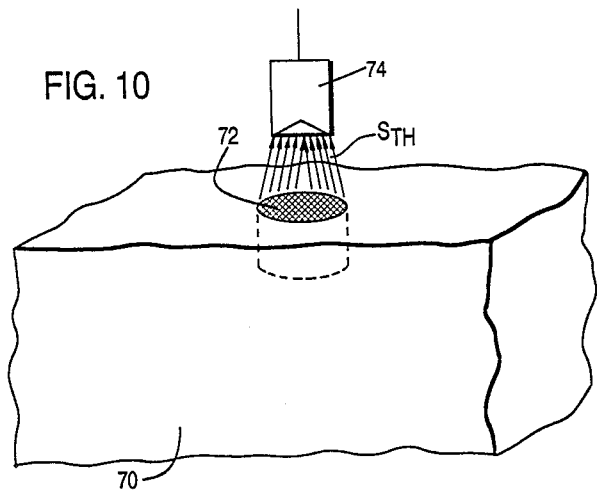

FIG. 10 is a representation of the arrangement of a heat sensor such as a pyroelectric detector, relative to a body to be measured, for recording its integral thermal energy state.

Figure 1:
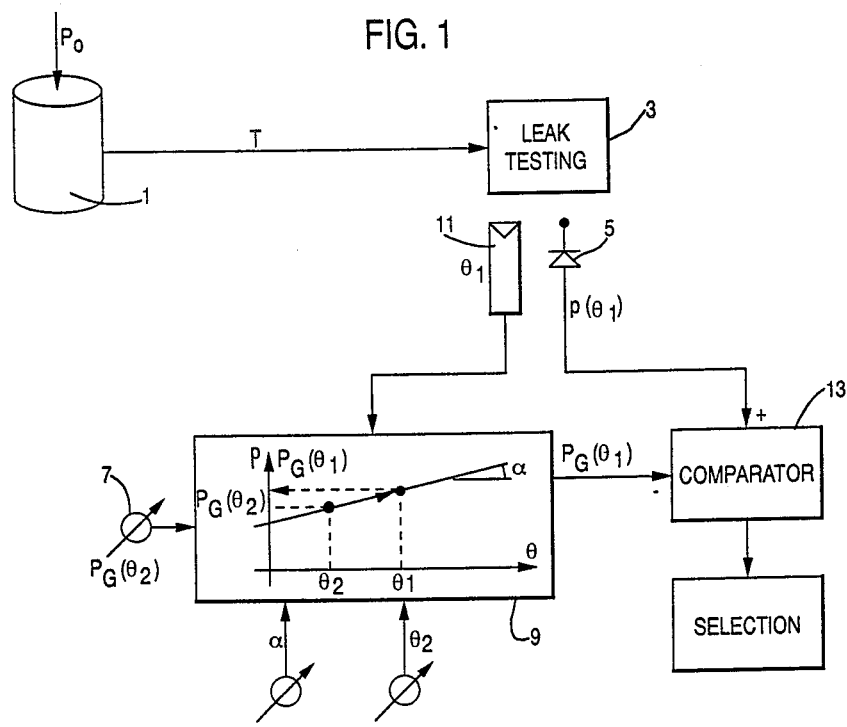

FIG. 1 shows, with reference to a block diagram, a first version of the proposed method or the corresponding device. A container 1, whose tightness is to be tested, is subjected to a test pressure relative to its environment $p_0$. Then the container is conveyed in an indeterminate time T to a leak testing station 3 of known design. The result of the leak test at point in time $t_1$ is a pressure value p measured with a sensor arrangement 5 during the time interval of leak testing, i.e. at time $t_1$ and at temperature $\theta_1$. Pressure value p, measured during leak testing, is for example the internal pressure of the container still prevailing after time T has elapsed, related to ambient pressure, or, if the container 1 is placed in an autoclave during the leak test, p is, for example the pressure which is then created in the autoclave. The technique used to perform the leak test, i.e. which pressure value p is observed, makes no difference within the scope of the present invention. It is important that a pressure $p(\theta_1)$ be available as a result of the leak test directly or indirectly.

The measured pressure value $p(\theta_1)$ as a measure of leakage must now be compared with a corresponding pre-determined pressure value $p_G$, i.e. it must be determined whether the measured pressure value is larger or smaller than the said limit value in order to decide whether the container should be designated tight or leaky.

According to FIG. 1, the limiting pressure value $p_G$ will differ from that at a temperature $\theta_2$, at which the limit pressure value $p_G$ was predetermined. The leak test temperature $\theta_1$ measured with a temperature measurement sensor 11 is supplied to correction unit 9. The latter operates basically as a function generator and takes into account the (at least in the first approximation) linear relationship between pressure value p and temperature $\theta$ at constant volume. By entering the slope $\alpha$ and pre-determining the limit pressure value $p_G$ at temperature $\theta_2$, the correction curve, as shown schematically, is set and the temperature $\theta_1$ recorded by sensor 11 is entered to this function, so that the limit pressure value $p_G$ is corrected from its predetermined temperature-relative value $\theta_2$, to the temperature-relative value $\theta_1$ actually present during the leak test, and as recorded by sensor 11. At the output of correcting unit 9, a signal which corresponds to corrected limit pressure value $p_G(\theta_1)$ appears, said signal now being compared in a comparison unit 13 with the measured pressure value, now both relative to the same temperatures $\theta_1$. From the comparison result at the output of comparison unit 13, the choice is now made as to whether tested container 1 is tight or not.

Instead of correction of the pre-determined limit pressure value $p_G(\theta_2)$ as shown schematically in FIG. 1, it is also quite possible to correct the measured pressure value $p(\theta_1)$ as a result of the leak test at point in time $t_1$. For this purpose, as shown schematically in FIG. 2, the temperature $\theta_1$ during time interval $T_1$ of the leak test is measured and, in a correcting unit 15, which takes into account the relationship (linear at least in the first approximation) between the pressure and temperature at constant volume, the measured pressure p, measured at temperature $\theta_1$, is corrected to the known temperature $\theta_2$ at which the limit pressure value $p_G$ was preset on preset unit 7. Correcting units 9 and 15 can be provided in extremely simple fashion using an analog technique.

Figure 3:
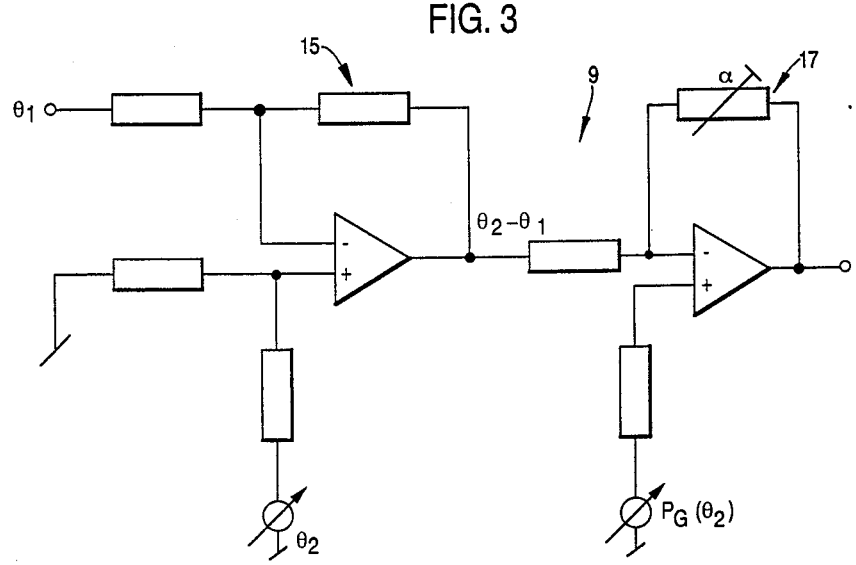
FIG. 3 is an amplifier circuit for implementation of a correcting unit like that shown in FIG. 1.

FIG. 3 shows a simple circuit for constructing correcting unit 9. A signal corresponding to temperature $\theta_1$ during the leak test is supplied to a first amplifier 15, with amplification 1, whereupon the difference between this signal, and a preset signal corresponding to temperature $\theta_2$ is formed. The latter corresponds to the temperature at which limit pressure value $p_G$ was preset. The input of another amplifier 17 is fed with the output signal corresponding to the temperature difference $\theta_2 - \theta_1$, the amplification of said amplifier being adjusted to correspond to the slope of curve $\alpha$. By presetting the offset to correspond to the limit pressure value $p_G$ at temperature $\theta_2$, the amplifier transfer characteristic is set so that, with a zero temperature difference $\theta_2 - \theta_1$, it passes through the value corresponding to the limit pressure value $p_G (\theta_2)$, in other words $\theta_1$ then equals $\theta_2$ and the preset limit pressure value can be compared directly with the measured pressure value.

Figure 4:
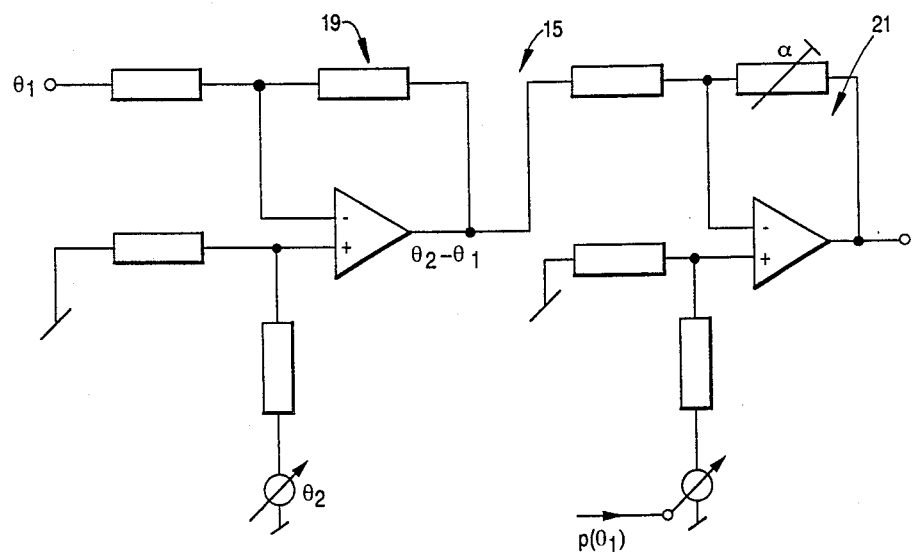
FIG. 4 shows an amplifier circuit for implementing a correcting unit like that shown in FIG. 2.

FIG. 4 shows a possible design for correcting unit 15 by analogy with FIG. 3. In a first amplifier 19, a difference signal corresponding to the difference between temperature $\theta_1$ during the leak test and the temperature $\theta_2$ at which the limit pressure value $p_G$ was preset, is formed. For this purpose, it has an amplification of one and if is supplied with a value corresponding to temperature $\theta_2$. The output signal corresponding to this temperature difference $(\theta_2 - \theta_1)$ is supplied to another amplifier circuit 21, whose amplification corresponds to the slope of curve $\alpha$. Since it is necessary in this case to locate the curve so that it runs through the measured pressure value p at temperature $\theta_1$, the "offset" signal of amplifier circuit 21 is controlled by the output of pressure sensor 5 in FIG. 2 with a signal corresponding to measured pressure value $p(\theta_1)$. Thus, there appears at the output of amplifier circuit 21 a signal which follows a straight line as a function of the measured leak test temperature $\theta_1$ with slope $\alpha$ and runs through the measured pressure value $p(\theta_1)$ with $\theta_2 = \theta_1$.

Figure 2:
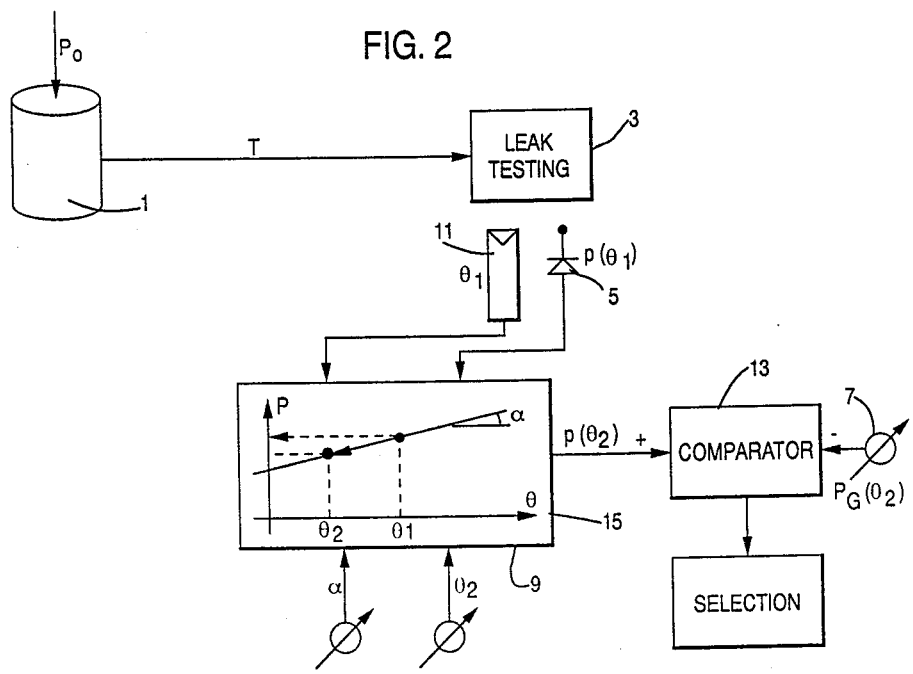

FIG. 5 shows a method which differs from the method shown in FIGS. 1 and 2. In the methods shown in FIGS. 1 and 2, temperature $\theta_1$ is measured at moment $t_1$ during leak testing or during a time interval before or after leak testing which is irrelevant as far as the rate of thermal changes in the container is concerned. In many applications, and depending on the technique used for leak testing, it is frequently desirable to separate temperature measurement and leak testing in time or space. If this is done, the temperature measurement on the container will not be the same as the temperature which prevails when the container is being leak tested. Thus, taking into account the time interval between temperature measurement and leak testing, a conclusion must be drawn from the temperature measurement at the beginning or at the end of this time interval regarding the container temperature at the end or beginning of this time interval, i.e. during the leak test.

The method proposed is shown in FIG. 5. Once again, container 1 is subjected to a test pressure value $p_0$. Then, after a certain time interval, container temperature $\theta_B(t_2)$ is measured at point in time $t_2$ with a temperature measuring device 31, based on initial temperature $\theta_u$. Essentially, the thermal behavior of the container is identified or calculated on an identification unit 33, i.e. especially its thermal time constant $\tau_{TH}$. For this purpose, input values I are entered into identification unit 33 in a manner to be described below. If the thermal behavior with thermal time constant $\tau_{TH}$ is given, this value, together with the measured container temperature $\theta_B(t_2)$ is fed into a simulation unit 35. From a knowledge of the temperature state corresponding to $\theta_B$ at point in time $t_2$ and the thermal time constant $\tau_{TH}$, simulation unit 35 forms over time the electrical simulation of the thermal container behavior, i.e. the function $$\theta_B(t) = \theta_B(t_2) \exp\{-(t-t_2)/\tau_{TH}\} \qquad (1)$$

In the example shown, the point in time of temperature measurement $t_2$ is before point in time $t_1$ of the leak test. Thus, the simulation can be accomplished by obtaining a function which decreases exponentially with thermal time constant $\tau_{TH}$, said function being excited with the initial value corresponding to $\theta_B(t_2)$ or $\theta_B(t_2) - \theta_U$. The temperature value $\theta_B(t_1)$ which corresponds to the container temperature during the leak test at time $t_1$ is determined by sampling or interrogating the output signal from simulation unit 35 at leak testing time $t_1$. This is accomplished by scanning unit 37, triggered by a sensor 39 which detects the occurrence of the leak test, which unit 37 then interrogates the output of simulation unit 35. Thus a signal appears at the output of scanning unit 37 which corresponds to:

$$\theta_B(t_1) = \theta_B(t_2) \exp\{-(t_1-t_2)/\tau_{TH}\} \qquad (2)$$

Thus, from a previous temperature measurement at time $t_2$, the container temperature $\theta_B(t_1)$ is determined for the subsequent leak test. With this signal, corresponding to the temperature, and by analogy to the explanation pertaining to FIG. 1 or FIG. 2, shown in FIG. 5 by analogy to FIG. 1, one enters entered into correcting unit 9, at whose output the limiting pressure value $p_G$ $(\theta_B(t_1))/$ appears, corrected according to the temperature difference of container temperature $\theta_B(t_1)$ during the leak test and the temperature $(\theta_2)$ at predetermined limit pressure $p_G(\theta_2)$. This value is, in turn, fed to comparison unit 13 together with the measured pressure value $p(\theta_B(t_1))$, relevant for the leak test, and the result of the comparison leads to a decision as to whether the tested container meets the tightness requirements or not.

It is also possible to perform the temperature measurement after the leak test and, in similar fashion, to correct the measured pressure value or the preset limit pressure value, whereupon the time function which simulates the thermal container behavior must be evaluated backwards, which can no longer be accomplished by direct simulation over time, but must be performed by calculation.

For identifying the thermal container behavior, it is critical to find or know the thermal time constant $\tau_{TH}$. This can be accomplished in different ways.

Figure 6:
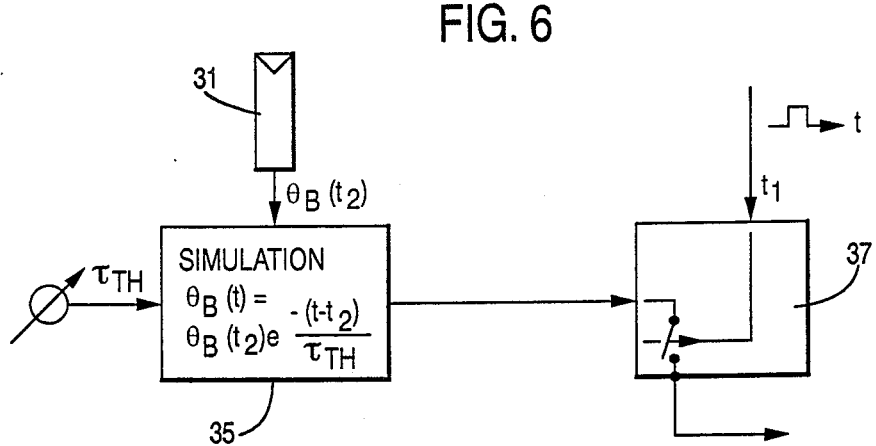
FIG. 6 is another embodiment of the representation shown in FIG. 5 with pre-identification of the thermal container behavior and corresponding direct simulation.

According to FIG. 6, in a first version thereof, an actual identification is performed before performing the method described. Here, the thermal behavior of the container is measured in advance on a test container and the thermal time constant $\tau_{TH}$ is determined from that. This value is then fed directly into simulation unit 35.

Figure 7:
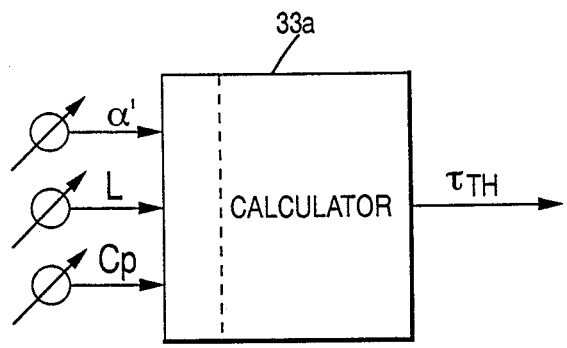
FIG. 7 is another embodiment of the device shown in FIG. 5 for on-line determination of thermal container behavior.

According to FIG. 7, instead of an experimental determination of thermal time constant $\tau_{TH}$ of the test object or container 1, the latter can be determined by calculation. This has the advantage that experimental determination of time constant $\tau_{TH}$, which can be tedious, is eliminated.

However, for this purpose, the values which determine thermal time constant $\tau_{TH}$, at least in a first approximation, must be known, i.e. the heat transmission coefficient $\alpha$, specific heat $c_p$, and dimension L of the container. These parameters of container 1 which determine its time constant and possibly of its filling medium are now entered into identification unit $33_a$ designed as a calculation unit, which determines from them the thermal time constant $\tau_{TH}$. This is then fed to simulation unit 35 as inputs I, as shown in FIG. 5. It is understood of course that, if identification is performed by calculation in the manner described here, simulation will also be performed by calculation, a procedure which in many cases is obviated by the use of known microprocessor technology, taking into account that, with the same computer modules, additional control, monitoring, and possibly regulating functions can be performed.

FIG. 8 shows in an analogous and simple fashion how on-line identification and simulation can be performed for each container to be tested. It must be remembered in this connection that thermal time constants $\tau_{TH}$ differ only in a limited range from one container to the next or even from one type of container to the next.

Basically, two measurements are performed during temperature measurement, either using a single detector with successive scanning or using two sensors staggered along a path of movement of a container 1 to be tested. The latter version is shown in FIG. 8 for the sake of clarity. Container 1 travels along its forward motion path after being subjected to test pressure $p_0$, first passing a first temperature sensor arrangement $31a$. The latter measures the temperature of the container $\theta_B$ at time $t_a$. The output signal from this measuring device $31a$ is fed to an identification and simulation unit 33, 35. The latter comprises a plurality of channels 1 to 4 etc. between input $E_1$ and output $A_1$, input $E_2$ and output $A_2$, etc. The output of arrangement $31a$ at the point in time at which container 1 is being measured is switched to inputs E of identification and simulation unit 33, 35. A switch $S_a$ shows schematically that the output of measuring arrangement $31a$ at time $t_a$ is switched to the above-mentioned inputs E. Each of the channels has a function generator. As shown, the latter are designed to be extremely simple and, among other things, each has a network with high-pass characteristic, for example as shown, RC elements. Each of the channels or the function generators associated with them are permanently tuned to staggered time constants $\tau_1$, $\tau_2$, etc. When the output signal from arrangement $31a$ is applied to all channels, function curves appear at channel outputs A which correspond to falling exponential functions with the channel-specific time constants and the initial value corresponding to the output signal of arrangement $31a$ at time $t_a$. After a time interval which need not be known and depends on the feed rate of the container, container 1 passes a second temperature measuring arrangement $31b$ whose output signal, as shown schematically by switch $S_b$, is then connected to a number of comparators $35_1$, $35_2$, whereupon the output signal from one of the channels is connected to each of comparators 35 at a second input. Thus, each of comparators 35 compares a signal corresponding to the container temperature at time $t_b$ with a channel output signal at the same point in time. If the channel time constants, as mentioned, are staggered successively, for example $\tau_1 < \tau_2 < < \tau_3 < \tau_4$, etc., the channel output signals will decrease to different extents accordingly. Thus, the comparison on the comparators will show which channel output value corresponds most closely to the output signal of temperature measuring arrangement 31$b$. When all the comparator outputs are checked, one comparator pair is found whose output signals are at different polarities. This is the case in the example shown between comparators 35$_2$ and 35$_3$ while the * in the comparator characteristics shown indicates their output signal. The comparator output signals are interrogated by means of a multiplexer unit 37. Clocked by a clock generator 39, multiplexer unit 37 sequentially connects one comparator output after the other to a monostable unit 41. When a change in polarity is detected between two comparator outputs connected sequentially, this produces a signal flank at the output of multiplexer unit 37 which triggers monostable unit 41 and produces an output pulse.

At the same time that multiplexer unit 37 is being clocked, the clock pulses from generator 39 are being supplied to a counter unit 43 which counts the pulses and thus determines which of the comparator outputs is connected at that moment through multiplexer unit 37. If the above-mentioned pulse appears at the output of monostable unit 41, counter 43 is stopped (not shown). A counting state on counter 43 is assigned to each of the channels. The outputs of the identification and simulation unit 33, 35, A, are connected by selector switch $S_U$ with the corresponding comparators 35. These switches $S_U$ are opened when the counting state on counter 43 corresponds to the channel-specific counting state and at the same time monostable unit 41 delivers a pulse which indicates that the channel for which this happens corresponds most closely to the thermal behavior of the container. Thus, when the pulse appears at the output of unit 41, through a decoding unit 45, the corresponding switch $S_U$ of the corresponding channel is switched; in the case shown it is switch $S_U$ for channel 3. It switches the output signal of the identification and simulation unit to a lead 47 to which a signal is now applied which corresponds to the thermal behavior of container 1 over time. When container 1 reaches the leak testing device at time $t_3$, this is recorded for example with a position switch 49 which then delivers a triggering pulse through a monostable unit 51. This pulse closes a switch $S(t_3)$ and switches lead 47 to the correcting unit 9 already described with reference to FIG. 1. This switched signal corresponds to the container temperature $\theta_B$ at time $t_3$, in other words at the time which is significant for leak testing. As already described, on correcting unit 9, not shown here in greater detail, the limit pressure value $p_G$ preset at $\theta_2$ according to FIG. 1 is corrected to the relevant container temperature value at $t_3$, thus the corrected limiting pressure value $p_G$ ($\theta_B(t_3)$) is then, as already described, fed to comparison unit 13 together with the measured, tightness-relevant pressure value $p(\theta_B(t_3))$ from sensor 5.

Thus, in this circuit, the thermal behavior of the container is identified and simulated with the channels of specific time constants. It is understood of course that identification can also be performed by measuring the container temperature at two points in time corresponding to $t_a$ and $t_b$ and the identification can be made by using the measured temperature values, by deriving them according, so that the time constant results. If the time constant $\tau_{TH}$ is given, the simulation is then performed by simulating an exponential function with an excitation corresponding to the measured value and the decay behavior corresponding to the time constant found. Here again, the simulated time function is interrogated at the point in time which is relevant for leak testing, in order to determine from it the container temperature during tightness. It is understood of course that, if the pressure values are not measured directly, but indirectly by measuring physical values which depend in known fashion on the pressure, the corrections can also be made on the values actually measured, taking into account their dependence on pressure and temperature.

In order to increase the accuracy of these temperature measurements on temperature measuring arrangements 11 and 31, the latter are performed during preset time intervals and the average temperature over these time intervals is processed further as a relevant measured value. This can be accomplished in known fashion by integration of the temperature output signals from the corresponding arrangements over a predetermined integration time, e.g. through an analog integrator or by relatively high-frequency sampling of the temperature output signals followed by a digital averaging over a preset number of samples signal values.

In addition, one problem involved in temperature measurement is that it is difficult to perform a measurement which is relevant for the temperature state of the container taking into account the fact that the container temperature by no means needs to be equal at different container points. This is taken into account by the fact that a plurality of temperature sensors scans the temperature of a container simultaneously and the average of the temperature values from all the sensors is determined as the relevant container temperature value. The expense incurred especially by providing a plurality of temperature sensors is relatively high. In addition, consideration must be given to the fact that in most applications the containers to be tested are not stationary relative to a reference system with the measuring arrangements but during continuous production pass along at a relatively high speed on a path along which the temperature sensors are mounted. A preferred arrangement of a temperature sensor, a pyroelectric detector for example, is shown in FIG. 9. Along a path X, containers 61, not yet sealed, move at speed v. A pyroelectric detector 63 is mounted in the vicinity of container movement path X in such fashion that container openings 65 pass it. It has now been found that the thermal radiation from the inside of container 61 is representative of the average of the temperature distribution within the entire container. Thus, the temperature is measured when a given container 61 is located with its opening 65 in the vicinity of the sensitivity characteristic of pyroelectric detector 63. To detect when this occurs, a separate position detector can be used. However, it is much simpler to make use of the fact that, as shown by a schematic output signal function $U(\theta)$ of detector 63, when a container opening lies opposite the detector, its output signal differs from the output signal when no container is present largely and independently of the ambient temperature. Thus, the output signal from detector 63 is first switched to a comparator unit 65, for which a threshold value $k_0$ is preset, with the latter being selected so that the output signal from detector 63 exceeds it only when an opening 65 enters its sensitivity characteristic. A switch $S_{63}$ is connected to the output of comparator 65, for example by a monostable unit 67 or by a bistable unit which is reset the next time threshold value $k_0$ is undershot, said switch transmitting the output signal from detector 63 as then representative for the corresponding container temperature to the devices shown in FIGS. 1–8 and connected on the output side of the temperature measurement devices. This principle can be used, apart from specific application for measuring container temperatures, in many other technologies as in the determination of the relevant average temperatures of bodies in general, as shown schematically in FIG. 10. If, on a body 70, a temperature which is relevant for its temperature state or its thermal energy content is to be measured, whereby in the general case the temperature distribution in body 70 is not balanced in three dimensions, a depression 72 is made in the body and the thermal radiation $S_{TH}$ is measured from depression 72, which depression acts like a black body, using a detector 74, a pyroelectric detector for example, brought into the immediate vicinity of depression 72. This eliminates the need for internal measurement of the temperatures of such bodies, which is often very troublesome.

Considering the temperature as proposed, in leak testing of containers eliminates one substantial source of error in known very precise leak testing techniques, whereby the accuracy of the corresponding leak test systems can be fully utilized for the first time. In addition, with the additionally proposed method for measuring a representative temperature of a body which is not in thermal equilibrium, a simple method has been found without having to perform measurements pointwise at various locations on the body.

I claim:

1. A method for leak testing containers, comprising the steps of:
    bringing a container into a pressure measuring unit;
    measuring a pressure value inside said container;
    brining said container out of said pressure measuring unit; and
    comparing said pressure value with a predetermined limit pressure value to determine whether said container is to be considered tight or leaky;
    wherein a temperature difference between a temperature of the determination of the limit pressure value and a temperature at the measurement of said pressure value, is taken into account, comprising the further steps of:
    measuring heat radiation of said container at least one of before and after it is brought into said pressure measuring unit;
    determining a time-span between a time at said measuring of said heat radiation and a time at said measuring of said pressure value;
    determining said temperature at the measuring of said pressure value from values of said measuring of said heat radiation, said determination of said time-span, and a heat radiation characteristic of said container versus time;
    comparing said pressure value and said limit pressure value;
    correcting one of said pressure value, said limit pressure value and a comparison of said pressure value and said limit pressure value from a temperature-relative value corresponding to the determined temperature and a temperature according to said heat radiation measured.

2. A method according to claim 1, wherein said heat radiation characteristic is determined by at least one of measurement and calculation.

3. A method according to claim 1, wherein said heat radiation characteristic is determined by measuring heat radiation of said container at least twice with a predetermined time-lag between said heat radiation measurements, and extrapolating said heat radiation characteristic from values of said measured heat radiation and said time-lag.

4. A method according to claim 1, wherein measuring of said heat radiation is performed at least twice and values of said measuring of said heat radiation are averaged.

5. A method according to claim 4, wherein said at least two measurements of said heat radiation are performed substantially simultaneously at different areas of said container.

6. A method according to claim 4, wherein said at least two measurements of said heat radiation are performed at substantially the same area of said container with a time-lag between said measurements.

7. A method according to claim 1, wherein measuring of said heat radiation is performed by placing a heat radiation measuring means outside of said container in an area adjacent to an opening of said container.

8. A method according to claim 7, wherein said container is moved across a sensitivity area of said radiation measuring means, an output signal of said radiation measuring means is monitored and compared with a predetermined characteristic to determine when said container opening lies within said sensitivity area of said radiation measuring means, and said output signal of said radiation measuring means is used to determine a temperature of said container when said output signal matches said predetermined characteristic.

9. A method according to claim 1, wherein said container is continuously moved towards said pressure measuring unit.

10. A method according to claim 1, wherein said container is one of a plurality of containers continuously moving towards said pressure measuring unit.

11. A method according to claim 1, wherein said container is a container leaving a producing machine for containers.

12. A leak testing system, comprising a testing unit with pressure measuring means to monitor a pressure inside a container; comparator means connected to said pressure measuring means and to an adjustable source for providing a predetermined reference pressure value, said comparator means generating an output signal representative of whether said container is considered tight or leaky, based on a comparison of an output signal of said pressure measuring means and said predetermined reference pressure value; heat radiation measuring means for producing an output signal to a correction unit; said correction unit being connected to said comparator means for supplying a corrected output signal of said comparator means, corresponding to said predetermined reference pressure value and said pressure inside of said container referenced to the same temperature.

13. A system according to claim 12, further comprising time measuring means, for measuring a time-span between a measurement of heat radiation of said container by said heat radiation measuring means, and a measurement of pressure inside said container by said pressure measuring means, said time measuring means generating an output to said correction unit, said correction unit correcting said output signal of said comparator means using said measured time-span.

14. A system according to claim 12, wherein said correction unit includes storing means for storing at least one heat radiation characteristic of said container, versus time.

15. A system according to claim 12, wherein said correction unit includes a calculator unit to calculate the temperature of said container while in said testing unit, using physical data of said container and said output signal of said heat radiation measuring means.

16. A system according to claim 12, wherein said heat radiation measuring means includes means to measure heat radiation at at least two separate times, and said correction unit corrects said output signal of said comparator means using an output signal from each of said at least two heat radiation measurements, and a time-lag between said measurements.

17. A system according to claim 12, wherein said heat measuring means includes at least two sensor means arranged for measuring substantially simultaneously heat radiation of separate areas of said container.

18. A system according to claim 12, the output signal of said heat radiation measuring means being led to a sampling unit for generating sample values according to said heat radiation, said sample values being led to an averaging unit to generate an averaged heat radiation representative value.

19. A system according to claim 12, wherein said heat radiation measuring means is arranged relative to a support means for said container, so as to align with an opening of said container on said support.

20. A system according to claim 19, wherein said heat radiation measuring means is a pyro-electric detector.

21. A system according to claim 19, wherein the output signal of said heat radiation measuring means is led to a comparator means to which one of a signal according to a predetermined reference radiation value and of a signal according to a predetermined reference time characteristic of heat radiation is led, an output signal of said comparator means enabling or disabling said output signal of said heat radiation measuring means to said correction unit.

22. A system according to claim 12, further comprising conveyor means for conveying said container towards and into said testing unit and for passing said container by said heat radiation measuring means.

* * * * *